United States Patent [19]

Bariol et al.

[11] 4,448,082
[45] May 15, 1984

[54] DIFFERENTIAL TYPE TRANSIT-TIME IONIC PICKUP

[75] Inventors: Roger Bariol, Olivet; Jackie Lecomte, Orleans; Jean-Marie Bouvet, Boulogne-Billancourt, all of France

[73] Assignee: Regie Nationale des Usines Renault, Boulogne-Billancourt, France

[21] Appl. No.: 306,851

[22] Filed: Sep. 29, 1981

[30] Foreign Application Priority Data

Oct. 7, 1980 [FR] France ............................. 80 21400

[51] Int. Cl.$^3$ ........................... G01F 1/56; G01F 1/70
[52] U.S. Cl. ............................. 73/861.05; 73/861.09; 250/324
[58] Field of Search .................. 73/861.05, 861.09; 250/324, 326, 356, 432 R, 435; 361/230

[56] References Cited

U.S. PATENT DOCUMENTS

| 2,569,974 | 10/1951 | Campbell | 73/861.05 |
| 3,996,795 | 12/1976 | Servassier | 73/861.09 |
| 4,056,003 | 11/1977 | Zizine . | |
| 4,152,935 | 5/1979 | Nagaishi et al. | 73/861.05 |
| 4,186,601 | 5/1980 | Maruoka | 73/861.05 |
| 4,220,045 | 9/1980 | Suzuki et al. | 73/861.05 |

FOREIGN PATENT DOCUMENTS

| 945662 | 7/1956 | Denmark . |
| 2389103 | 11/1978 | France . |
| 2439302 | 5/1980 | France . |

Primary Examiner—Herbert Goldstein
Attorney, Agent, or Firm—Oblon, Fisher, Spivak, McClelland & Maier

[57] ABSTRACT

Ionic air-flow pickup (1) consisting of two working areas (2) and (3) separated by an intermediary grid (4) and associated with devices (5) to power the emission area (2) and devices (8) to detect the signals given off by the receiving area (3) in order to obtain an electrical signal which depends on the volume flow.

10 Claims, 14 Drawing Figures

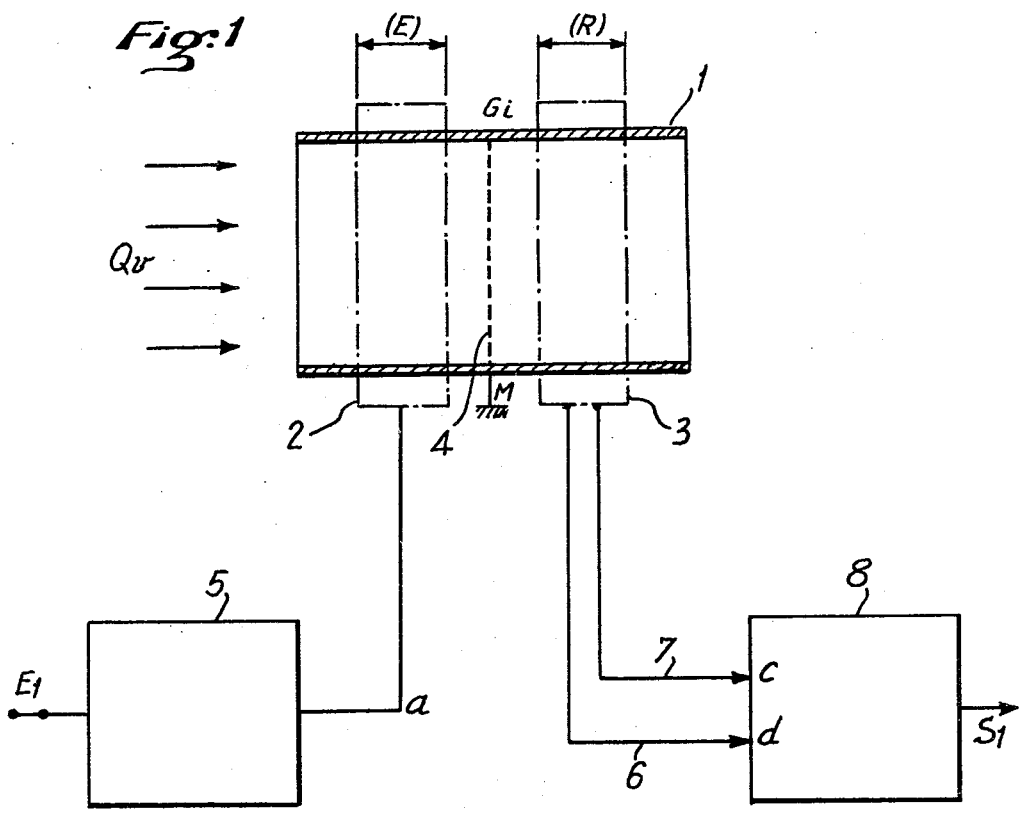
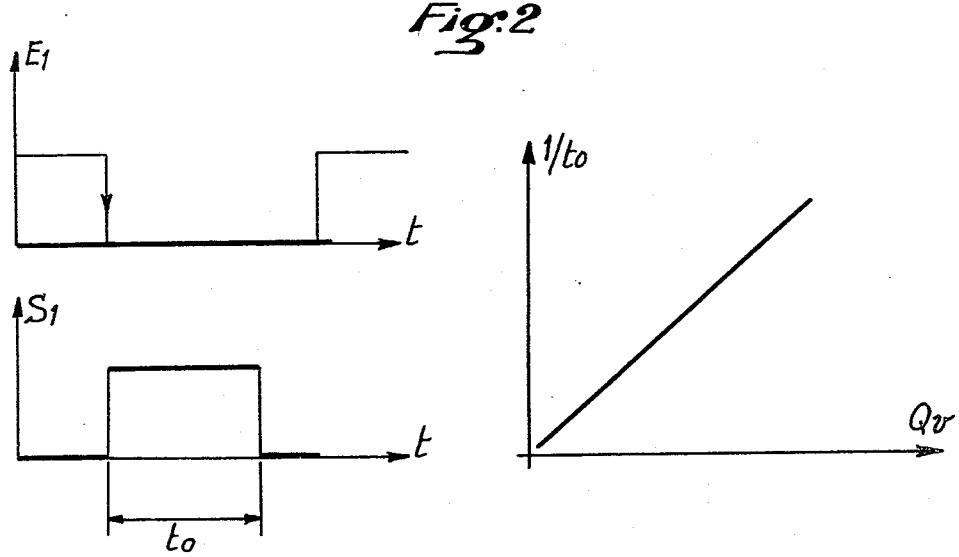

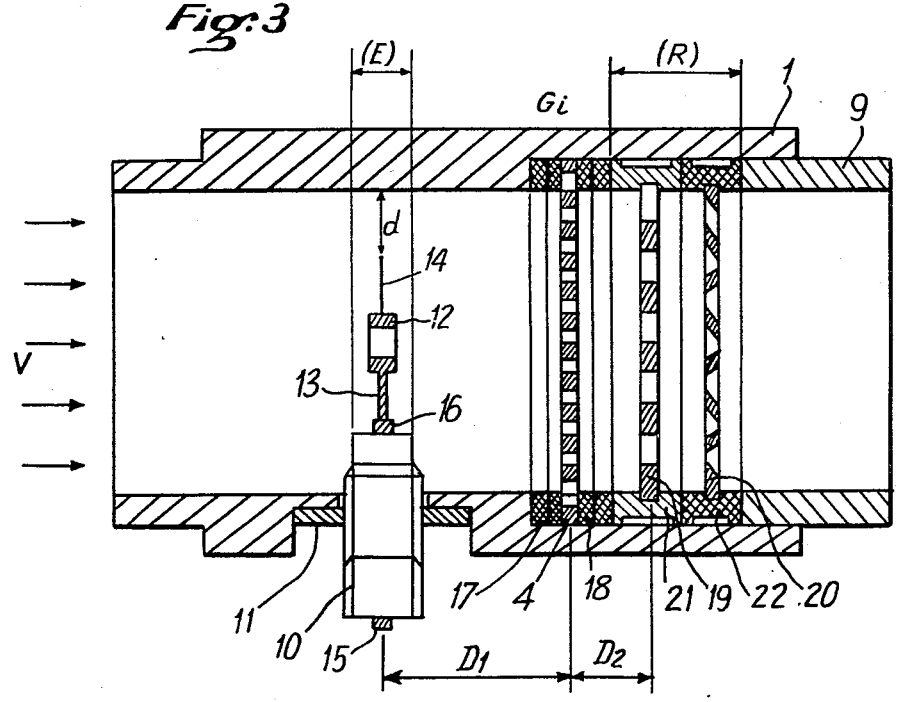
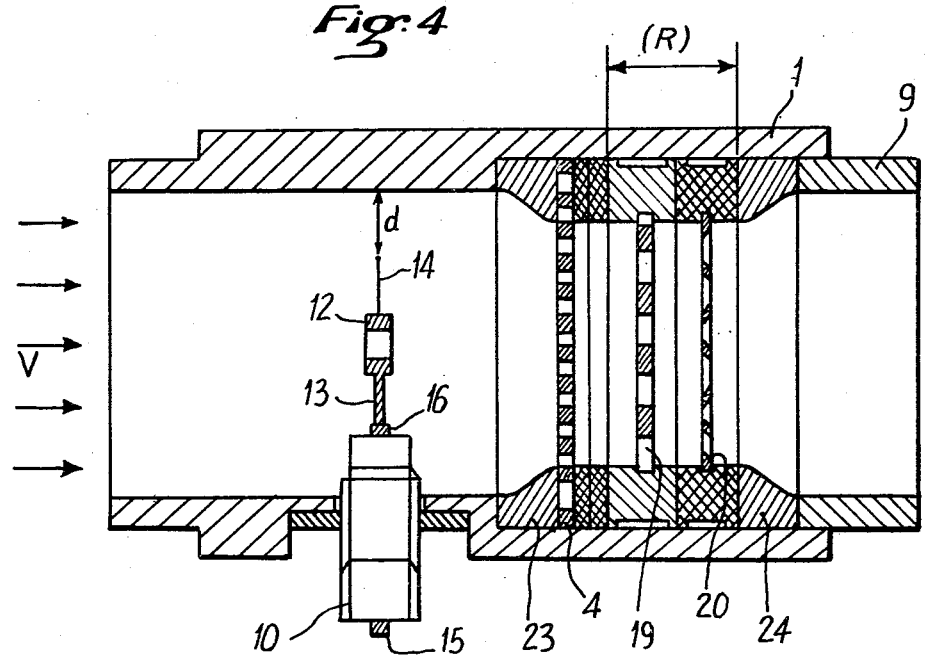

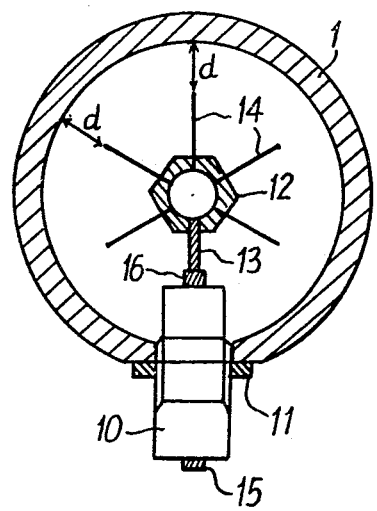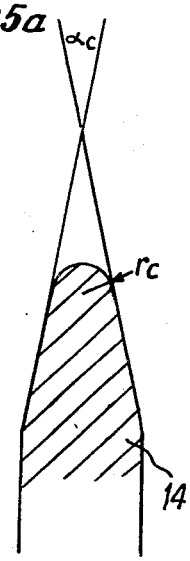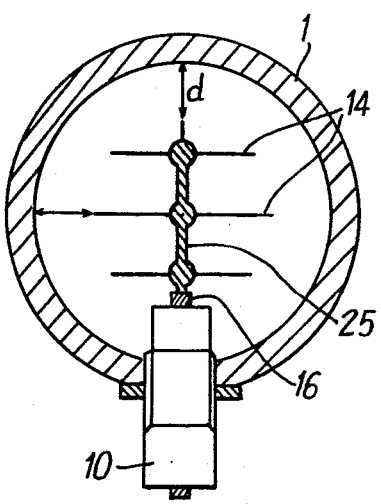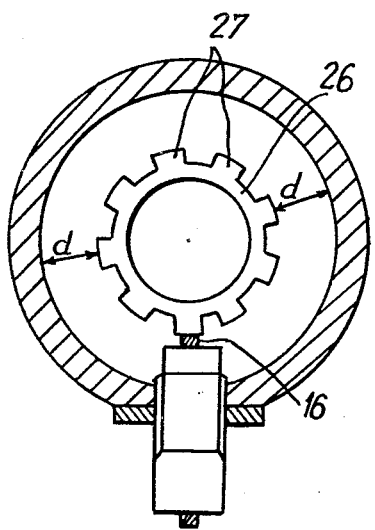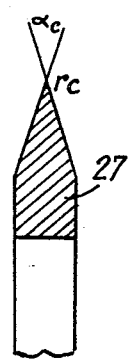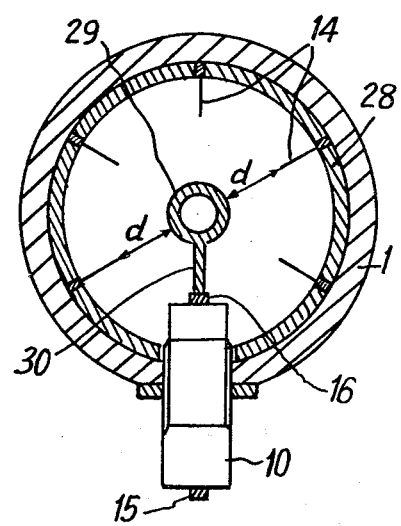

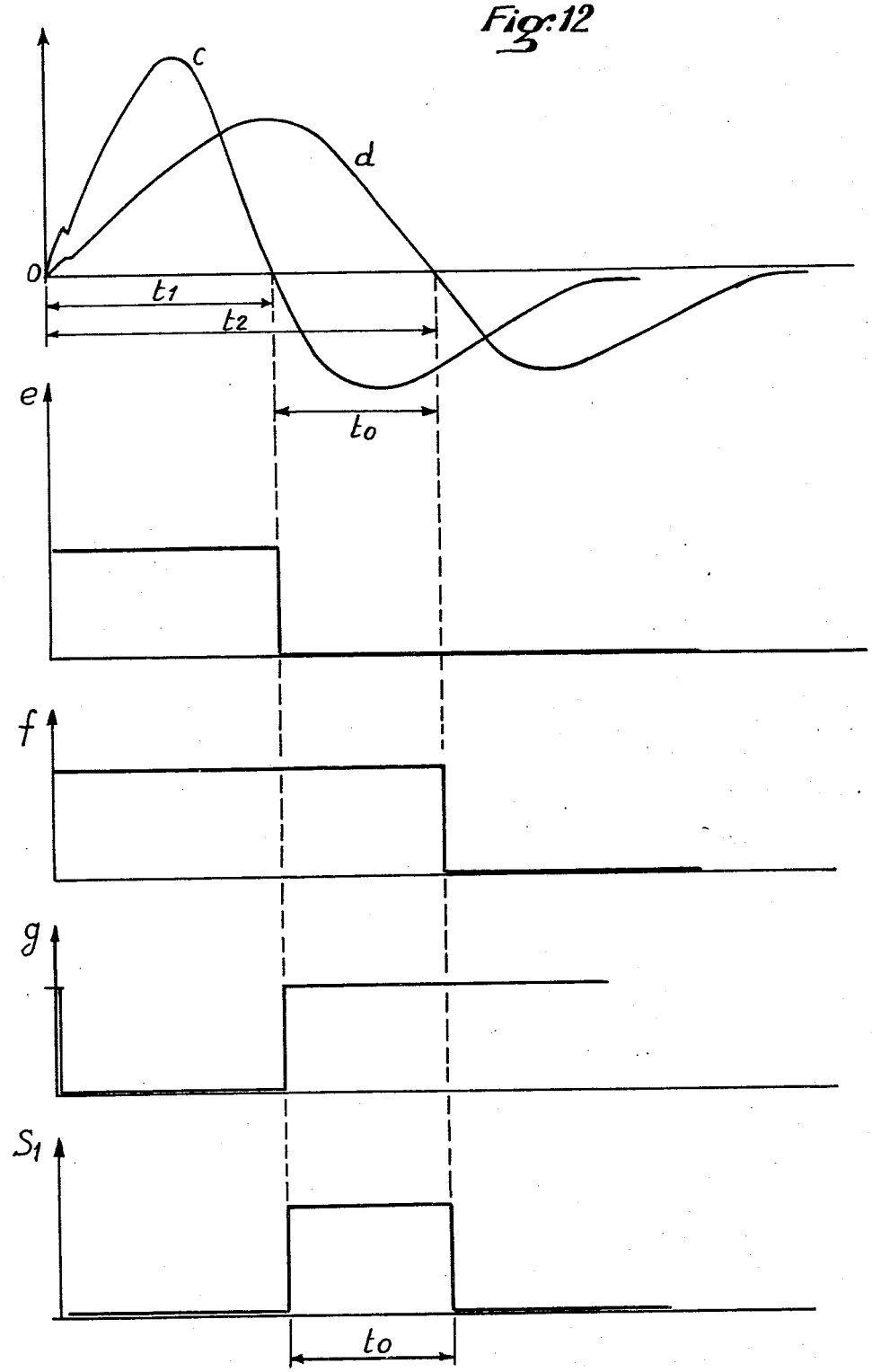

DIFFERENTIAL TYPE TRANSIT-TIME IONIC PICKUP

BACKGROUND OF THE INVENTION

1. Field of the Invention

The present invention concerns an ionization flow-metering pickup and its associated electronic processing equipment, which taken together constitute a device for measuring the volume flow of a stream of gas by means of the displacement of ions along trajectories which are largely parallel to the stream.

The flow-metering pickup of the present invention is a transit-time anemometer type which is designed for measuring an air flow with a view to controlling the richness of the air-fuel mixture fed into an internal combusion engine.

2. Description of the Prior Art

The principle of transit-time anemometers is well known to specialists. It consists in measuring the time it takes for a jet of ions, induced to travel at the same velocity as the gas stream, to travel between an emission electrode and a receiving electrode. The emission electrode is a point which receives a brief, high-tension pulse which causes the ionization of the gas in its vicinity. The cloud of ionized gas thus formed gives off an electric pulse which is detected when the cloud passes a receiving electrode.

The application of such transit-time anemometers to the measurement of the intake flow in a thermal engine poses a number of difficulties.

The amplitude of the signal detected by the receiving electrode depends both on the velocity of the gas stream and the ionization conditions, i.e., the amplitude of the high-tension pulse and the nature of the emission point. The electrical data obtained thus depends on several parameters, which complicates electronic processing.

In addition, the cloud of ions is generally created by a single emission point. The rate of ionization is hence quite low, which, at a slow stream velocity, yields an electrical signal at the receiving electrode which is difficult to use. This limits the measurement capability of the pickup. The cloud of ions is not uniformly distributed through the cross section of the fluid stream vein, resulting in a measured velocity which is not representative of the average velocity of the gas stream.

In this type of pickup, for a given geometric and for a rather high stream velocity, the width of the high-tension impulse which creates the cloud of ions is no longer negligeable as against the time of passage of this same cloud of ions. The phenomena of emission and cloud displacement are superimposed, which constitutes an additional factor of error.

The present invention makes it possible to avoid these drawbacks. Its subject is a structure for the embodiment of a transit-time ionic pickup associated with an electronic device which makes it possible to obtain an electrical magnitude in the form of a pulse whose width depends on the volume flow stream of the gaseous fluid in the intake manifold.

SUMMARY OF THE INVENTION

The embodied structure of the pickup according to the invention entails two receiving grids situated downstream from the emission system. The time measured is the time of passage between these two grids. A differential type system is obtained because any disturbance affecting the signal received on the first receiving grid will also affect the signal received on the second grid. After electronic processing, the resulting signal will depend only on the stream velocity and will be independent of the disrupting phenomena. The embodied structure of the pickup according to the invention also includes an emission system which makes it possible to increase the ionization rate and to distribute this ionic emission throughout the entire cross section of the fluid vein. Thus the receiving electrodes obtain a signal which is usable even at a very slow stream velocity, which makes it possible to satisfy the full range of operation of a thermal engine.

The electronic device associated with the pickup also makes it possible to provide the emission device of the pickup with a synchronous high-tension pulse whose maximum value is constant regardless of the operating conditions. This arrangement makes is possible to have a constant ionization level.

According to the invention, the embodied structure of the transit-time ionic pickup involves two distinct areas: an emission area (E) and a receiving area (R), the two said areas being separated by an intermediary grid (Gi).

The emission area (E) is made up of several emission electrodes which are radially equally distributed in a plane perpendicular to the stream. These emission electrodes are fine needles whose radius of curvature at the tip is a few dozen microns. These electrodes are brought to a potential of several kilovolts for a very brief period of time with respect to the potential of the outer envelope of the pickup which is grounded. The peak effect between the tip of each needle and the outer envelope of the pickup results in the creation of an intense electric field which ionizes the area. Hence there are as many ion clouds created as there are emission electrodes in the right angle section of the pickup. This arrangement makes it possible to achieve an emission area which involves the entire fluid vein of the pickup and thus to have symmetrical distribution.

The receiving area (R) is made up of two grids which are insulated electrically from the outer envelop of the pickup and arranged perpendicularly to the displacement of the ion clouds. This detection grids are made up of perforated metallic pieces such as grids or perforated sheets. The detection grids detect the passage of the transiting electric charges by influence. Thanks to an appropriate electronic circuitry, the instant of passage of the charges is detected.

The intermediatry grid (Gi) separating the (E) and (R) areas is a grid of the same type as the detection grids. It is designed to prevent the direct influence of the high-tension pulse on the receiving electrodes.

BRIEF DESCRIPTION OF THE DRAWINGS

Understanding of the invention will be facilitated upon examination of the detailed description of several embodiments thereof, taken by way of example and in no way restrictive and illustrated by the attached drawings, in which:

FIG. 1 represents a synoptic overall diagram of a flow pickup with the associated electronics;

FIG. 2 illustrates the shape of the input and output signals obtained with the components described in FIG. 1;

FIG. 3 is a cross section view of a transit-time pickup;

FIG. 4 is one variant embodiment of a transit-time pickup;

FIG. 5 illustrates a first embodiment mode of the pickup's ionization system;

FIG. 5a illustrates a detail of the embodiment of one part of the ionization system of FIG. 5;

FIG. 6 illustrates a second embodiment mode of the pickup's ionization system;

FIGS. 7 and 7a illustrate a third embodiment mode of the pickup's ionization system;

FIG. 8 illustrates a fourth embodiment mode of an ionization system;

FIG. 12 represents the shape of the signals appearing at various points of the diagram of FIG. 11.

DESCRIPTION OF THE PREFERRED EMBODIMENTS

Figure 9:
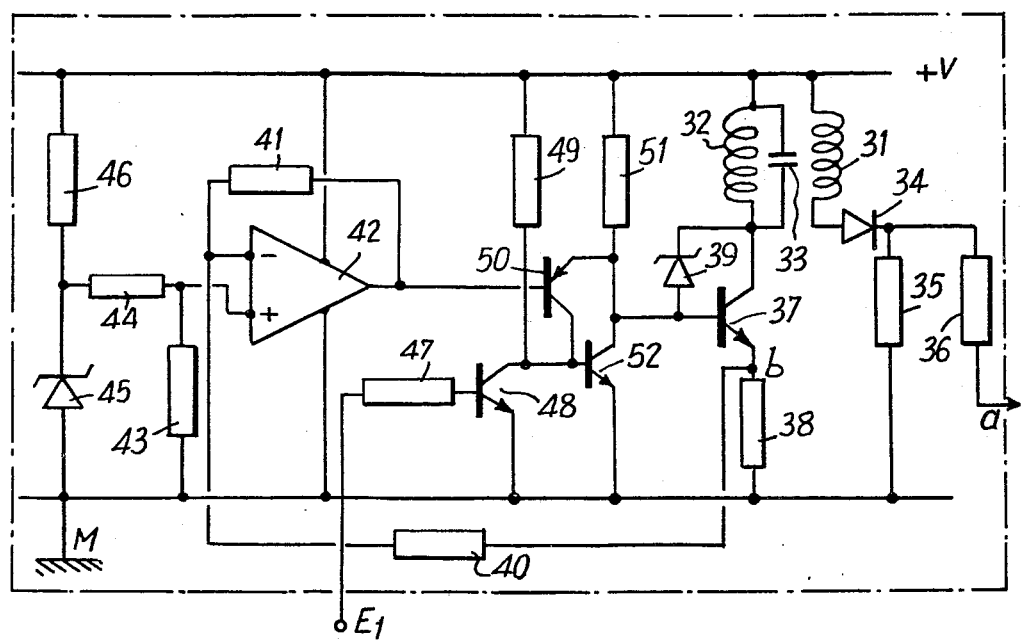
FIG. 9 represents schematically the electronic device which provides the high-tension pulse to the ionization system.

Referring now to the drawings, wherein like reference numerals designate identical or corresponding parts throughout the several views, and more particularly to FIG. 1 thereof, the ionic transit-time pickup consists of a metallic envelope 1, grounded by means of connection M and through which passes a gas with a volume flow Qv. The metallic body 1 basically includes two pickup operation areas: an emission area (E) with reference number 2 and a receiving area (R) with reference number 3. These areas (E) and (R) are separated by an intermediary grid (Gi) with reference number 4. This grid 4 is mechanically connected to the metallic envelope 1. It is likewise grounded electrically through connection M.

The emission area 2 of the pickup is supplied with a high-tension pulse from a command unit 5, itself controlled by external command signals E1.

The receiving area 3 of the pickup outputs signals through connections 6 and 7 to a processing unit 8. This processing unit 8 provides a signal S1 at its output for a time $t_o$ which is proportional to the magnitude Qv in accordance with the functional relationships shown in FIG. 2.

The schematic representation of FIG. 3 shows the parts making up the emission area (E) and the receiving area (R) of FIG. 1.

The emission area (E) consists of an ionization system which includes several fine needles with reference number 14, arranged radially about a central part 12.

The central body 12 is fixed mechanically by a pivot 13, itself connected mechanically and electrically to the output terminal 16 of an insulating crossmember 10. The input connection of crossmember 10 bears reference number 15.

The insulating crossmember 10 carrying the high-tension pulse to the ionization needles 14 is mechanically fixed in the outside envelope 1 of the pickup and immobilized by a screw 11.

The intermediary grid Gi with reference number 4 is mechanically connected to the body 1 by metallic shims 17. In addition, these metallic shims 17 make it possible to vary the distance D1 between the emission area and the intermediary grid. The grid Gi serves a dual purpose. On the one hand, it makes the gas stream more turbulent and homogeneous thanks to its fine mesh. On the other, it significantly attenuates the direct influence of the high-tension signal radiated on the grids of the receiving system (R).

The receiving area (R) consists of two receiving grids 19 and 20. This grids are held in place by insulating washers 21 and 22 maintained inside the envelope 1 of the pickup. Thick shims 18 make it possible to adjust the distance D2 between the intermediary grid 4 and the first receiving grid 19.

Grids 19 and 20 are electrically collected to a dual output terminal, not shown in the figure, allowing the signals received to be passed on. The intermediary grid 4, the adjustment shims 17 and 18, and receiving grids 19 and 20 are held in place by a socket 9 inserted into the body 1 and thus constituting the other end of the pickup.

In the schematic representation of FIG. 4, where the parts described have the same reference numbers, there is shown a pickup structure in which the receiving area how a smaller cross section than that of the emission area. This arrangement makes it possible to increase the stream velocity in the receiving area and hence to obtain a higher signal on the receiving grids. This arrangement is obtained by means of the identically profiled shims 23 and 24. These shims hold grids 4, 19 and 20 together. This arrangement thus makes is possible to measure a smaller volume flow corresponding to a less powerful thermal engine without changing the outside dimensions of the pickup or the structure of the emission system. This modular aspect of the structure of this pickup permits a high degree of adaptation flexibility.

FIG. 5 represents a cross section of the emission area (E). The ionization system of the emission area consists of several fine needles 14 which are equally distributed radially inside the fluid vein of the pickup. This needles 14 are held in place by a central part 12 which has a hole in its center. The central part 12 is connected to a pivot 13, itself attached to the output terminal 16 of the insulating crossmember 10.

The needles 14 have their ends placed at a distance (d) from the inside edge of the body 1 of the pickup.

FIG. 5a represents the detail of the ends of needles 14. These ends are characterized by a slight angle $\alpha_c$ at the tip and a radius of curvature $r_c$ of a few microns. This arrangements makes if possible by peak effect between the end of each needle and the body of the pickup to have a very intense electrical field which will ionize the moving molecules. As there are several needles distributed in the cross section of the pickup, overall there is obtained a cloud of ions distributed throughout the entire fluid vein, which improves the precision and measurement range of the system.

FIG. 6 represents another embodiment mode of an ionization system for the emission area (E) in which the needles 14 are distributed in a rake pattern around a central pivot 25 connected to the output terminal 16 of the insulating crossmember 10. This system has seven needles and is constructed in such a way that the ends of these seven needles form a concentric circle situated at a distance d from the inside surface of the body 1 of the pickup. The ends of needles 14 in FIG. 6 have the same outline as the one indicated in FIG. 5a.

FIG. 7 represents another embodiment mode of an ionization system for the emission area (E) in which a notched washer 26 is used, said washer having a number of notches 27 uniformly distributed at its periphery. These notches 27 are cut on a bias so as to have at their ends an angle profile at the end and a radius of curvature identical to those of the needles described in FIG. 5a.

FIG. 8 represents another embodiment mode of the ionization system. The needles 14 are attached radially to the inside of a metallic crown 28 surrounded by the inside of the envelope 1 of the pickup. The central portion includes a hollow cylinder 29 attached to the output terminal 16 through a pivot 30. Unlike the arrangements described in FIGS. 5, 6 and 7, it is necessary to send out, at terminal 15 of the crossmember 10 of the arrangement in FIG. 8, a high-tension pulse which is negative with respect to the grounded envelope 1 of the pickup. There is hence a positive electric field between each point end and the central part 29 which creates positive ions.

Figure 10:
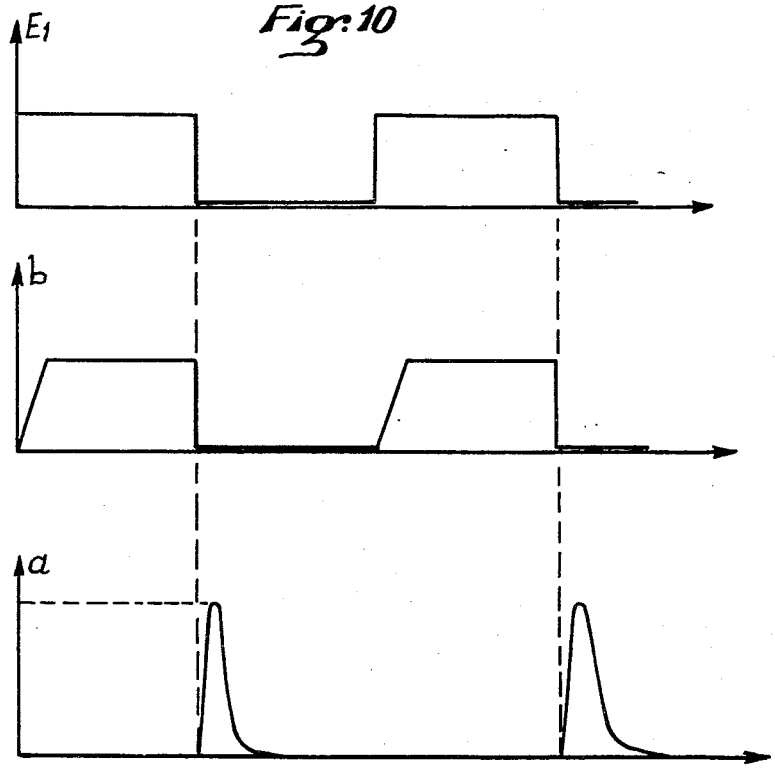
FIG. 10 represents the shape of the signals appearing at various points of the diagram of FIG. 9.

In FIG. 9 is a schematic representation of the key parts of the module 5 which delivers its high-tension pulses upon receipt of external command signals E1 visible in FIG. 10.

The high tension pulse is provided by a secondary transformer line 31, the primary 32 of which is controlled by a transistor with reference number 37. A capacitor 33 in parallel on the primary winding 32 makes it possible to slightly dampen the oscillations obtained at the terminals of the secondary winding 31. A diode 34 followed by a grounded resistor 35 makes it possible simultaneously to load the secondary circuit and to obtain, in the case of branching of 34 as shown in FIG. 9, a positive pulse with respect to ground M. This positive pulse is sent through a protective resistor 36 to one of the previously described ionization systems.

The emitter of transistor 37 has a resistor 38 connected to ground. The signal b appearing at the terminals of 38 is thus representative of the current circulating in primary winding 32 when the transistor 37 is conductive. Signal b given off by 38 and visible in FIG. 10 is sent to the negative input terminal of an amplifier 42 whose loop gain depends on resistors 40 and 41. The positive input of 42 receives a reference voltage determined by resistors 43 and 44 from a power source stabilized by a Zener diode 45 in series with a resistor 46.

The signal given off by the amplifier 42 commands the base of a transistor 50 which, through the load resistor 51, makes it possible to regulate the base current of transistor 37 and hence the current circulating in primary winding 32.

The command signal E1 represented in FIG. 10 commands, through a base resistor 47, a transistor 48 which is loaded through resistor 49. The signal emerging from collector 48 commands the base of a transistor 52 which is loaded through resistor 51. Transistors 48 and 50 make it possible to cause transistor 37 to conduct or be turned off. The conduction current of 37 is regulated at a given value by virtue of the components of the regulating loop controlling transistor 50. A Zener diode 39 placed between the collector and the base of transistor 37 makes it possible to protect the latter against the excess voltage appearing at the terminals of primary winding 32.

It is thus apparent that, thanks to this device for regulating the current to the primary 32, the high tension pulse represented by a in FIG. 10 has a constant amplitude.

It bears noting that, in order to obtain a negative high-tension pulse required for an ionization device such as the one represented in FIG. 8, it suffices to reverse the direction of the wiring of diode 34 as well as that of the wires powering secondary winding 31.

Figure 11:
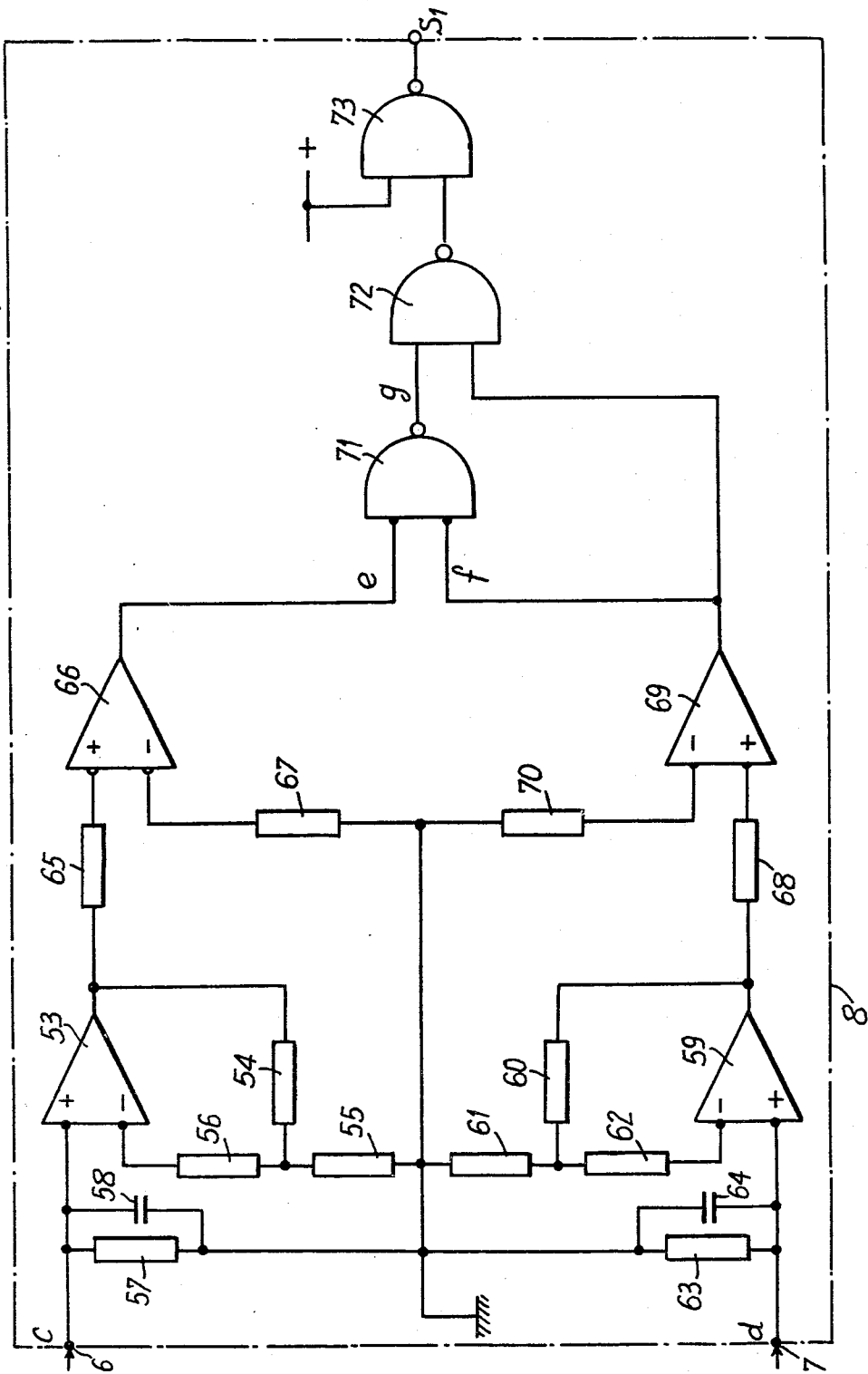
FIG. 11 represents schematically the electronic device measuring the time of passage of the cloud of ions.

FIG. 11 is a schematic representation of the key parts of unit 8 of FIG. 1, at the output of which is given off a signal S1 whose width corresponds to the time of passage of the ions between the two receiving grids 19 and 20.

The signal obtained on the primary receiving grid 19 is transmitted by connection 6 to the positive terminal of an operational amplifier 53. The input impedance of this part 53 is determined by resistor 57 and by capacitor 58, mounted in parallel. The signal c appearing on grid 19 is represented in FIG. 12. The gain of amplifier 53 is regulated by resistors 54 and 55; resistor 56, connected to the negative terminal of 53, makes it possible to balance the input impedance. The amplified signal provided by 53 is sent to an amplifier 66 through a resistor 65 connected to the positive input terminal. Part 66 forms a high gain nil comparator due to resistor 67 connecting the negative input terminal of 66 to ground.

At the output terminal of comparator 66, there is formed a signal e represented in FIG. 12 and whose width t1 corresponds to the time during which the signal c output by grid 19 is greater than zero. The instant at which signal c passes to zero corresponds to the instant of passage through the barycenter of the cloud of ions in the plane of grid 19.

The signal obtained on the second receiving grid 20 is transmitted via connection 7 to the positive input terminal of an operational amplifier 59. The input impedance of the amplifier 59 is determined by resistor 63 and capacitor 64 mounted in parallel. Resistor 62, connected to the negative input terminal of 59, makes it possible to balance the input impedance. Signal d appearing on grid 20 is represented in FIG. 12. This signal is amplified by amplifier 59, the loop gain of which is regulated by resistors 60 and 61. The amplified signal given off by 59 is sent, through a connecting resistor 68, to the positive input terminal of an amplifier 69 which forms a zero comparator because of the resistor 70 wired between the negative input terminal of 69 and ground.

At the output terminal of comparator 69, there is formed a signal f represented in FIG. 12 and whose width t2 corresponds to the time during which the signal d given off by grid 20 is positive. The instant signal d passes to zero corresponding to the instant of passage through the barycenter of the cloud of ions in the plane of grid 20.

By means of logic circuits 71, 72 and 73 carrying out the "NAND" function, at the output of unit 8 is obtained a signal S1 whose width is t0=t2−t1 and which corresponds to the time of passage of the cloud of ions between grids 19 and 20.

Finally, we obtain an ionic pickup associated with two electronic command and detection modules which make it possible to obtain an output signal whose width depends on the volume flow circulating in the cross section of the pickup. The processing of the output signal may be carried out with great calculating precision thanks to the potential of current microprocessing systems. The modules which feed the ionization system on the one hand and process the signals from the receiving area on the other both function on direct current, which is perfectly suited to the demands of automobile electronics. The modular structure of the pickup gives it great flexibility for adaptation to different flow ranges.

The differential measurement of the time of passage in the receiving zone makes it possible to disregard a number of disruptive phenomena.

Of course, the invention is in no way limited to the embodiment modes represented and described. In particular, as regards the receiving area of FIG. 1, theory indicates and experience confirms that other forms of receiving electrodes may be considered. Such electrodes, placed in the right-angle cross section of the pickup, may be in the form of rings of ring-mounted grids. The receiving grids may also have a curvilinear profile. The receiving electrodes may also be separated by an intermediary grid electrically grounded to the pickup.

I claim:

1. Ionic transit-time pickup of the type which includes a body having an emission area (E) and a receiving area (R), associated with an electronic device making it possible to obtain an electric magnitude in the form of a pulse whose width depends on the volume flow of a gaseous fluid in an intake manifold, wherein said receiving area (R) comprises two parallel grids (19, 20) between which is measured the transit time of the ionized particles so that a differential measurement system is established and wherein said emission area (E) contains a multiplicity of emission electrodes (14, 27) which are equally distributed radially in a plane perpendicular to the stream of the gaseous fluid and which are supported by a portion (12) which is centered in said body.

2. Ionic transit-time pickup according to claim 1, further comprising an intermediary grid (4) separating said emission area (E) from said receiving area (R).

3. Ionic transit-time pickup according to claim 1, wherein said emission electrodes (14) are five in number.

4. Ionic transit-time pickup according to claim 1, wherein said emission electrodes (27) are constituted by the outside bias-carved extremity of notches made uniformly in the periphery of a notched washer (26).

5. Ionic transit-time pickup according to claim 1 wherein said emission electrodes are five in number and are attached radially to the inside of a metallic crown held inside said body.

6. Ionic transit-time pickup of the type which involves a body having an emission area (E) and a receiving area (R), associated with an electronic device making it possible to obtain an electric magnitude in the form of a pulse whose width depends on the volume flow of a gaseous fluid in an intake manifold, wherein said receiving area comprises two parallel grids (19,20) between which is measured the transit-time of the ionized particles so that a differential measurement system is established and wherein said emission area (E) contains a multiplicity of emission electrodes which are seven (7) in number and are distributed in rake fashion about a central pivot (25) connected to the output terminal (16) of an insulating cross member (10) in such a way that the free ends of the said seven electrodes are distributed in a circle concentric to said body.

7. Ionic transit-time pickup according to any one of claims 1, 2, 3, 4 and 6, wherein the cross section of said receiving area (R) is restricted with respect to that of the emission area (E) by interpositioning profiled shims (23, 24) whose outline is identical for purposes of gripping together the grids (4, 19, 20).

8. Ionic transit-time pickup according to any one of claims 1, 2, 3, 4 and 6, where said two parallel receiving electrodes in the receiving area (R) are each placed between two shielding grids.

9. Ionic transit-time pickup according to any one of claims 1, 2, 3, 4 and 6, wherein said receiving electrodes of the receiving area (R) are made up by two annular profiles placed perpendicularly to the direction of the stream of gaseous fluid.

10. Ionic transit-time pickup according to any one of claims 1, 2, 3, 4 and 6, wherein said electronic device includes a regulating loop (40, 41, 42, 50) making it possible to adjust a high-tension signal applied to said emission area electrodes to a given value.

* * * * *